United States Patent [19]

Urbanic

[11] Patent Number: 4,485,511
[45] Date of Patent: Dec. 4, 1984

[54] DIE HEAD WITH DIFFERENT AXIAL TOOL PATHS

[75] Inventor: Robert F. Urbanic, Mentor, Ohio

[73] Assignee: PMC Industries, Inc., Wickliffe, Ohio

[21] Appl. No.: 407,085

[22] Filed: Aug. 11, 1982

[51] Int. Cl.³ .............................................. B23G 1/00
[52] U.S. Cl. .................................................... 10/96 T
[58] Field of Search ...................... 10/87, 95, 96, 96 R, 10/96 T, 111, 120, 120.5 R; 408/20, 23, 24, 168, 169, 170, 221; 144/205

[56] References Cited

U.S. PATENT DOCUMENTS

| | | | |
|---|---|---|---|
| 3,082,446 | 3/1963 | Benninghoff | 10/120.5 R |
| 3,829,920 | 8/1974 | Theverkauf | 10/96 T |
| 4,118,140 | 10/1978 | Hamilton | 10/120.5 R |

Primary Examiner—E. Michael Combs
Assistant Examiner—Charles Rosenberg
Attorney, Agent, or Firm—Maky, Renner, Otto & Boisselle

[57] ABSTRACT

A rotary die head has radially extendable and retractable thread cutting tools moving in paths of different angularity relative to the workpiece to permit one tool to cut a load flank in the workpiece at one lead and another tool simultaneously to cut a stab flank in the workpiece at a different lead, with the tools commonly generating the thread root, whereby a dual lead tapered thread may be formed on the workpiece in one pass. The respective cutting tools may have chasers with multiple teeth to permit the formation of deeper dual lead tapered threads in one pass. The die head may also have a radially extendable and retractable turning tool commonly driven with but moving in opposite directions from the thread cutting tools, whereby the turning tool when extended may form a seal or thread relief surface on the workpiece while the thread cutting tools are retracted.

30 Claims, 9 Drawing Figures

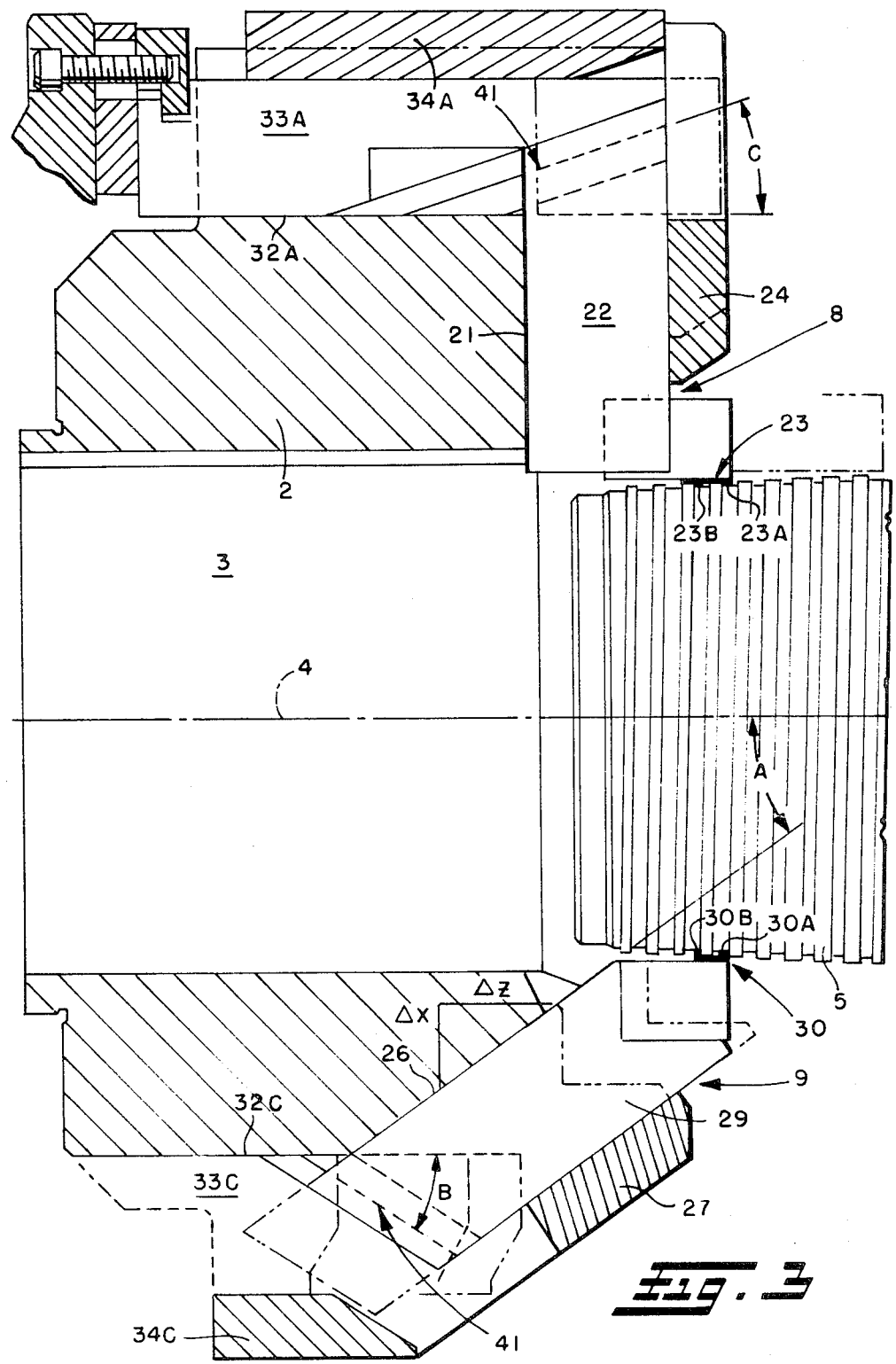

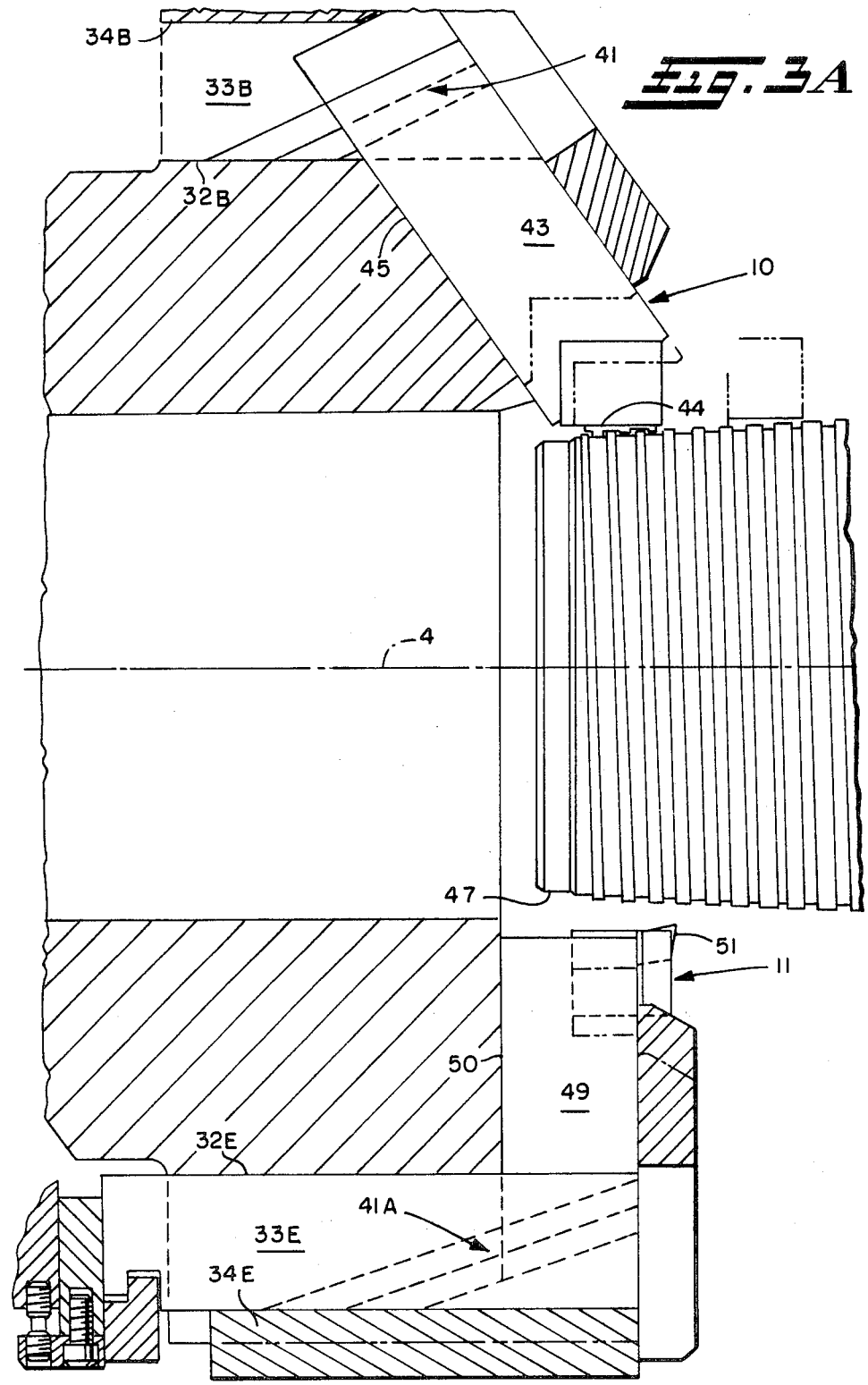

DIE HEAD WITH DIFFERENT AXIAL TOOL PATHS

FIELD OF INVENTION

The present invention relates to a rotary die head in general and to a rotary die head having thread cutting tools simultaneously moving in paths of different angularity relative to the workpiece, in particular.

BACKGROUND OF THE INVENTION

Rotary die heads having a plurality of circumferentially spaced, radially movable cutting tools are well known in the art. Reference may be had for example to U.S. Pat. Nos. 3,082,446; 3,645,638 and 3,812,548. These rotary die heads cut threads of uniform and continuous groove configuration in the workpiece in one pass.

However, a thread joint for oil well tubing has recently been developed having a tapered thread configuration with the pitch diameter and crest or pitch width increasing from one thread end to the other. Reference may be had to U.S. Pat. No. 3,989,284 for a showing of such a threaded connection. In this thread configuration, the load flank and stab flank are at different leads. This type of connection will be referred to hereafter as a dual lead tapered thread. This type of thread is not believed to be in commercial production but is expected to be used in applications where the integrity of the threaded connection is important.

In trying to make the dual lead tapered thread in conventional rotary die head operations, at least two passes have been required because of the different flank leads and increasing pitch diameter and crest width. The necessity for having more than one pass of the workpiece with currently available rotary die heads will increase production time and expense.

OBJECTS AND SUMMARY OF THE PRESENT INVENTION

The principal object of the present invention is to provide a rotary die head capable of cutting a dual lead tapered thread in one pass of the workpiece.

It is another object of the present invention to provide a die head having circumferentially spaced tools simultaneously moving with radial equality but with different angularity relative to the workpiece.

To accomplish these two objectives, at least one chaser block must be committed to cutting the stab flank of the thread at a given lead while at least one other chaser block must be committed to cutting the load flank of the thread at a different lead. The stab and load flank tools cooperate to commonly generate the thread roots and either or both may generate the thread crests. The stab and load flank tools are driven by simultaneously actuated wedge blocks having tongue and groove camming connections with the respective chaser blocks carrying the cutting chasers. The tongue and groove connections have varying angularity in accordance with the related angularity of the tool being driven thereby to provide rectilinear reciprocation of the respective tools in their respective guide slots of different relative angularity.

It is still another object of the present invention to generate the dual lead tapered thread in one pass of the workpiece as expeditiously as possible. To this end, if the stab and load flank chasers are not cumulatively as wide as the widest thread root of the dual lead tapered thread being formed, then another chaser block may be committed to being a root finishing chaser. To avoid conflict with the slab or load flank chasers, the root finishing chaser block path relative to the workpiece is inclined at angle having one half of the axial change per revolution that the stab flank chaser block has.

It is still a further object of the present invention to employ multiple tooth chasers on the stab flank chaser block, on the load flank chaser block, and/or on root finishing chaser block. The multiple tooth chasers are configured for the specific thread configuration being cut and may be used, in conjunction with additional power, to cut deeper dual lead tapered threads in one pass. The chasers may be mounted on their respective chaser blocks in axially displaced positions relative to one another with the axial displacement and tooth configuration being selected for the specific dual lead tapered thread being formed.

It is yet another object of the present invention to provide a die head capable not only of forming the dual lead tapered thread in one pass but also of performing auxillary operations such as cutting a conical sealing surface at the end of the workpiece. To this end, one or more of the chaser blocks may have a seal turning tool cartridge mounted axially ahead of and radially outwardly from the chaser tool. If this cannot be done because of clearance and/or stability problems, one or more of the circumferentially spaced chaser blocks may have the auxillary tool mounted thereon and be operated by a reverse wedge to move in an opposite radial direction from the thread cutting chasers.

It is yet still a further object of the present invention to provide ease of maintenance to expedite repairs and/or adjustments thereby to enhance productivity of the die head. To this end, the wedge blocks driving the chaser blocks are each independently adjustable and the chaser blocks are enclosed in quick change cover plates.

DESCRIPTION OF THE DRAWINGS

FIG. 3 is a section of the cylindrical body of the die head taken along the plane 3—3 in FIG. 1 showing the different angularity for the load flank and stab flank chaser blocks, with multiple tooth chasers being used thereon;

FIG. 3A is a section of the cylindrical body of the die head taken along the plane 3A—3A in FIG. 1 showing the mid flank or root finishing chaser block with multiple tooth chaser and the seal turning or thread relief chaser block, the latter being driven by a reverse wedge;

DETAILED DESCRIPTION OF THE PREFERRED EMBODIMENT

Figure 1:
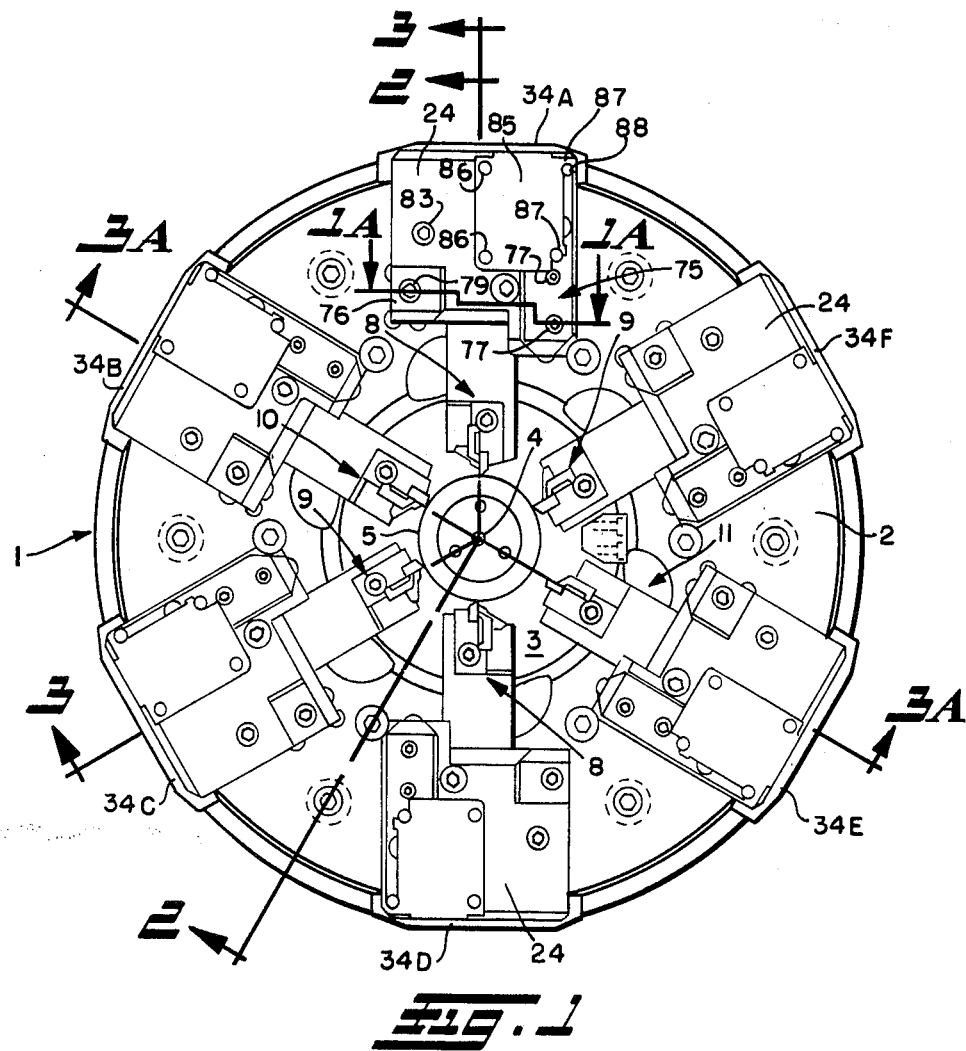
FIG. 1 is a front elevation of the rotary die head of the present invention.
Figure 2:
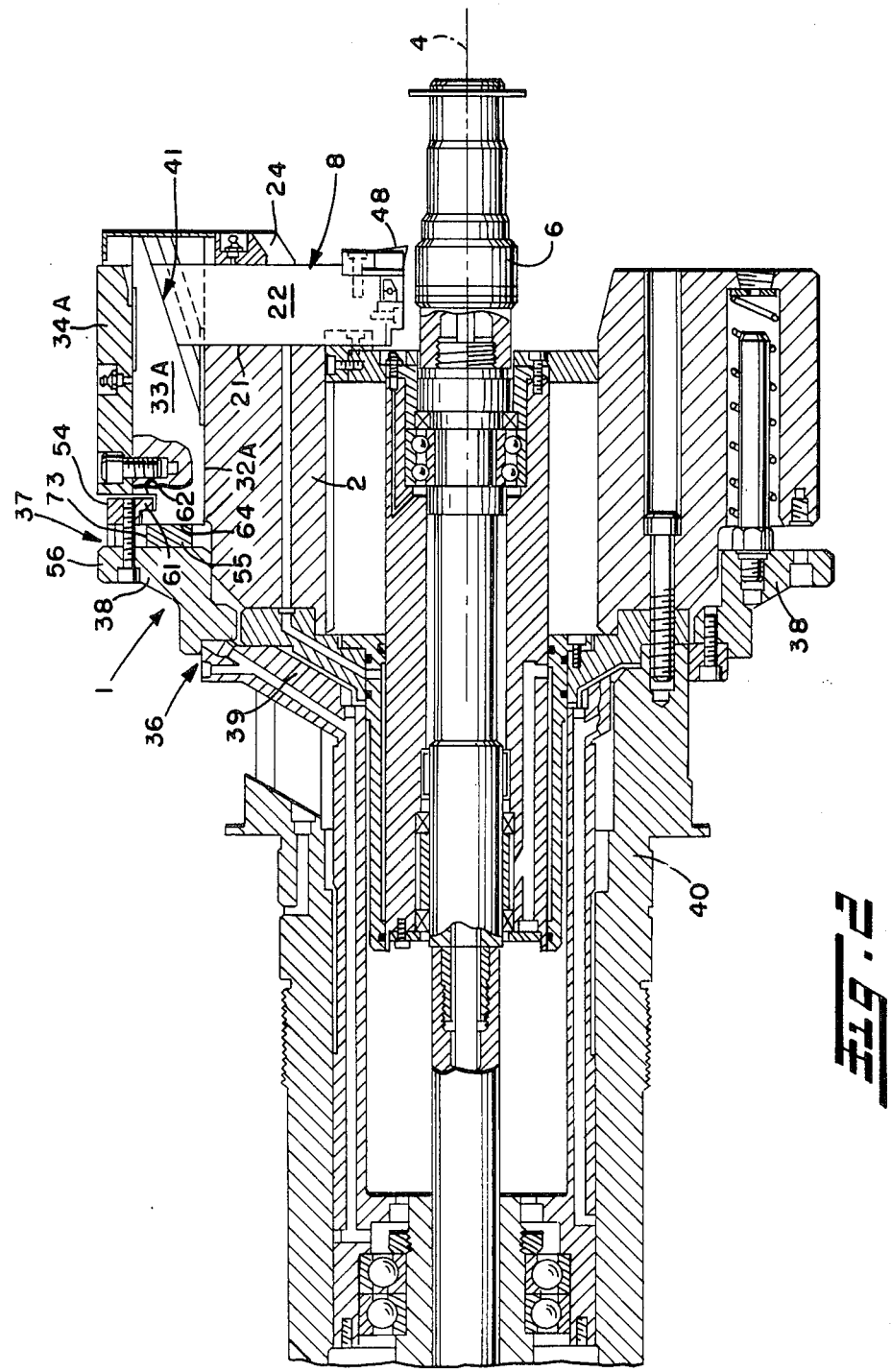
FIG. 2 is a fragmentary longitudinal section of the die head taken along the section line 2—2 in FIG. 1 showing the load flank chaser tool and workpiece mandrel.

Referring now to FIGS. 1 and 2 of the drawings, the rotary die head, indicated generally at 1, includes a generally cylindrical body 2 having a central bore 3 with longitudinal axis 4. A workpiece 5, such as a length of pipe or the like, may be coaxially inserted into bore 3 on mandrel 6 of the die head for threading and finishing by the circumferentially spaced, reciprocally driven tools mounted in the die head. The position and number of the tools may be selected and dedicated as required by the specific thread and operational parameters presented. In the example shown, six tools have been selected with two load flank tools, two stab flank tools, one mid flank tool and the reverse wedge sealing tool being respectively generally indicated in FIG. 1 by the reference numerals 8, 9, 10 and 11. These circumferentially spaced tools are oriented and commonly driven in such fashion as to cut a dual lead tapered thread in one pass.

Figure 3B:
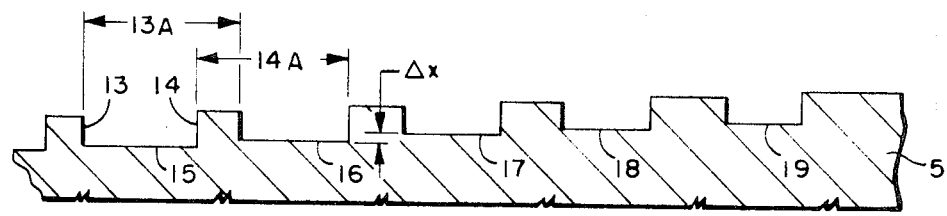
FIG. 3B is an enlarged fragmentary section of the dual lead tapered thread cut in the work piece by the die head of the present invention.
Figure 4:
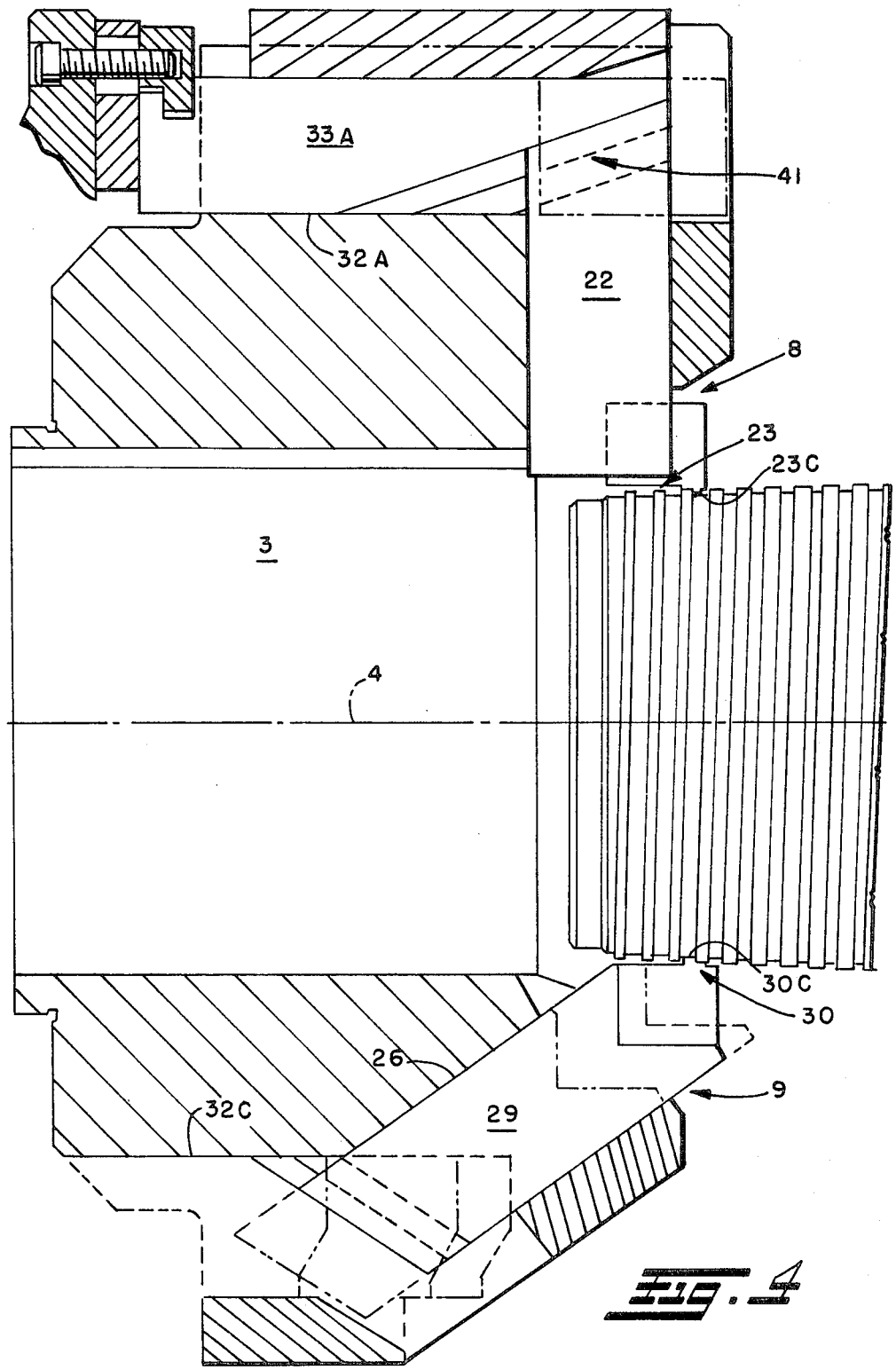
FIG. 4 is a section of the cylindrical body of the die head of the present invention similar to FIG. 3 but showing singular tooth chasers on the load flank and stab flank chaser blocks.

As shown in FIG. 3B, the dual lead tapered thread has a load flank 13 and stab flank 14 of different radial depths. The dual lead tapered thread has a changing pitch diameter and pitch from one end to the other and has a different load flank lead 13A than stab flank lead 14A. The thread geometry thus has a radial change per revolution of 66 x and a root width change per revolution of $\Delta z$. The axial root width change $\Delta z$ per revolution may be determined, of course, by substracting the stab flank lead 14A from load flank lead 13A. The respective root widths become successively smaller along the thread as seen by comparing the root widths 15 through 19 in FIG. 3B. The dual lead tapered thread section when mated with a corresponding threaded female section provides wedge type locking characteristics in radial and axial directions between the two pipe sections so threaded. This wedge lock has both the stab and load flank in contact with the mating thread flanks. Reference may be had to U.S. Pat. No. 3,989,284 for specific dual lead tapered thread configurations including threads having dove tailed flanks. To cut this dual lead tapered thread with the present invention, at least one pass of a chaser must be committed to cutting the load flank 13 at one selected lead, and at least one pass of another chaser must be committed to cutting the stab flank 14 at a different lead.

To this end, as best shown in FIG. 3, two diametrically opposed load flank slots 21 are provided at the end of body 2 and extend radially outwardly from bore 3. A load flank chaser block 22 carrying a multiple tooth chaser 23 on its radially inner end is selectively reciprocally driven in each slot 21 for guided sliding movement relative thereto. A front cover plate 24, discussed in more detail hereinafter, is removably connected to the end surface of body 2 to close each slot 21 to provide retention and guidance functions. Two diametrically opposed stab flank slots 26 with removable covers 27 are provided at the end of body 2 and are circumferentially spaced from the load flank slot 21. Each of the stab flank slots 26 extends outwardly from bore 3 at an angle A relative to longitudinal axis 4. The angle A is chosen to match the ratio of the radial change per revolution ($\Delta x$) of the thread to the root width change per revolution ($\Delta z$) of the thread. A stab flank chaser block 29 carrying a multiple tooth chaser 30 at its radially inner end is selectively reciprocally driven in each stab flank slot 26 for guided sliding movement relative thereto.

The two load flank chaser blocks 22 and the two stab flank chaser blocks 29 are commonly driven for equal radial movements but different axial movements because of their different paths of angularity relative to axis 4. Although two load flank chasers and two stab flank chasers have been described for exemplary purposes, different numerical combinations of load flank and stab flank chaser tools may be used if required by the operating parameters, as long as the stab and load flank chasers are commonly driven in the above described relative relationship.

To this end, the body 2 has a plurality of axially oriented and circumferentially spaced slots 32A-F in its outer annular surface generally in respective circumferential alignment with but slightly offset from the chaser slots, as shown and described in U.S. Pat. No. 3,082,446, which is incorporated herein by reference thereto. A plurality of wedge blocks 33A-F are respectively individually received in slots 32A-F and are retained therein by removable cover plates 34A-F. The wedge blocks are axially reciprocated in the covered slots by a common drive assembly indicated generally at 36.

As shown in FIG. 2, such drive assembly 36 includes a plurality of wedge block adjustment clamp assemblies 37 respectively adjustably securing the individual wedge blocks 33A-F to a common annular drive ring 38, as described in more detail hereinafter. This wedge ring is secured to a wedge ring suport sleeve 39 that is axially reciprocally driven in conventional manner relative to the spindle 40. This axial reciprocal movement causes each of the wedge blocks 33A-F to be axially reciprocated in equal magnitudes to drive the respective chaser blocks.

The driving interconnections between the respective wedge blocks 33A-F and the chaser blocks generally aligned therewith consist of sliding tongue and groove connections indicated generally at 41. Although tongue and groove connections have been used in die heads before (as shown, for example, by U.S. Pat. Nos. 3,082,446; 3,645,638 and 3,812,548), the angularity of the tongue and groove connections is varied in accordance with the respective angularity of the chaser slots as shown by comparing the difference between angles B and C in FIG. 3. This selected variance in tongue and groove angularity provides rectilinear drive for each of the chaser blocks in its respective slot.

In operation, a workpiece 5 is inserted into the bore 3 of body 2 along axis 4. The spindle 40 and the die head 1 connected thereto are rotated at relatively high speeds in conventional manner. Concurrently with such rotation, the drive ring 38 is advanced axially to the right as viewed in FIG. 2 to drive the wedge blocks 33A-F to the right. This wedge block movement provides relative sliding movement of the tongue and groove connections 41 to cam the chaser blocks 22 and 29 radially inwardly toward the inserted workpiece.

The different angularity between the respective tongue and groove sliding connections makes the chaser blocks 22 and 29 move at effectively equal radial rates and thus equal radial distances but the stab flank chaser blocks 29 are moving faster by the hypotenuse function to provide their axial component of movement relative to the load flank block. Therefore, the multiple teeth of chasers 23 and 30 will cut the load and stab flanks 13 and 14, respectively, to proper depths in one pass upon their simultaneous radial advancement. The teeth of chasers 23 and 30 commonly generate the thread roots and one or both of the chasers simultaneously generate the thread crests. This crest generation is performed by the chaser cutting surfaces between or adjacent the projecting teeth.

By using multiple teeth on each chaser, the present die head may cut relatively deeper thread roots in one pass if sufficient horsepower is available. In this regard, the right teeth 23A and 30A on the chasers 23 and 30 make the initial stock removal from pipe 5. Teeth 23A and 30A are not radially as long as their respective next adjacent teeth 23B and 30B on chasers 23 and 30, respectively. Teeth 23B and 30B subsequently finish the stock removal begun by teeth 23A and 30A to complete the thread root. In this fashion, the individual teeth are removing approximately equal amounts of stock material but are cooperating to cut a deeper thread than would be possible with individual teeth. The number of chaser teeth may be varied and staggered relative to one another as required by the thread configuration and stock material being cut. In addition, the chasers may be relatively axially staggered on their respective blocks as required by operating conditions and parameters.

The cutting width of the individual chaser teeth cannot be greater than the narrowest thread root being formed, in this case 19. The narrowest thread root has the largest finished root diameter, and the stab flank tool cutting plane moves closer to the load flank tool cutting plane as the tools recede radially outwardly in cutting the dual lead tapered thread. If required for the thread being cut, the cutting planes of the load and stab flank tools may merge for the narrowest thread root having the greatest finished root diameter. Therefore, the number of die head revolutions necessary for the common root and crest generations by the chasers is dependent upon the cutting tooth size and root width change for the particular thread being cut. However, this thread generation can be accomplished by one axial pass of the workpiece relative to the die head requiring only one set up procedure. The magnitude of sleeve movement 39 is varied in controlled fashion in accordance with the thread being formed and the relative location of the workpiece to cut the dual lead tapered thread in one pass of the workpiece.

If the chaser teeth 23A, B and 30A, B cannot cumulatively generate the widest thread root in one pass of the die head, the thread forming operation may be expedited by committing one or more additional chaser blocks to such generation. As shown for example in FIGS. 1 and 3A, a mid flank tool 10 has been committed to this purpose. The mid flank tool 10 has a chaser block 43 with a mid flank or root finishing chaser 44 being mounted on its radially inner end. The mid flank chaser block 43 is selectively reciprocally driven in a covered slot 45 in the end of the die head body 2. The covered slot 45 is inclined at an angle having about one half the axial change per revolution that the stab flank chaser block has. In other words, if the angle A for the stab flank chaser is 55° and the load flank chaser is radially driven, then the angle for the root finishing slot 45 is approximately 72½° relative to the axis 4 of body 2. By thus inclining slot 45, the root finishing chaser does not interfere with the stab and load flank chasers during operation and has a cutting plane between the stab and load flank cutting planes until merger occurs in the narrowest finished thread root.

In operation, the mid flank chaser block 43 is reciprocally cammed in its slot 45 through a tongue and groove connection with its wedge block being driven by the drive assembly 36. This tongue and groove connection 41, as shown in FIG. 3A, is inclined at a complimentary angle to the angle of slot 45 to rectilinearly drive the chaser block 43 in slot 45 for selective reciprocation therein. The chaser block 43 is simultaneously driven in and out with the stab and load flank chaser blocks and has equal radially inwardly and outwardly directed motion at equal rates, but has different axial movement because of the hypotenuse function. As best shown in FIG. 3A, mid flank chaser 44 may have multiple teeth, and these teeth cut the workpiece material between the load and stab flanks.

The above described die head structure can form a dual lead tapered thread in one pass of the workpiece. At times, auxillary operations must be performed on the workpiece, such as forming a conical sealing surface 47 at the end of the workpiece 5 or a thread relief surface at the terminal end of the thread. The present invention may perform these auxillary operations before or after the thread forming to permit the entire workpiece to be finished in one pass.

For this purpose, one or more chaser blocks, such as load flank chaser block 22, may have a turning tool cartridge 48 mounted on the front face thereof. As shown in FIG. 2, the turning tool cartridge 48 is located axially ahead of and radially outwardly from load flank chaser 23. To form the sealing surface, the workpiece is inserted into bore 3 only far enough to have its end engaged by the cutting edge of turning tool cartridge 48 when the latter is advanced into operation engagement. To effect such advance, the sleeve 38 is advanced further to the right as viewed in FIG. 1 than it is for the above described thread forming operation. In such case, the chasers 23, 30 and 44 (if used) would clear the end of the workpiece 5 to permit cartridge 48 to form sealing surface 47 without obstruction or interference. Similarly, when the dual lead tapered thread is being formed, the turning tool cartridge 48 is positioned radially outwardly from the workpiece to avoid interference.

A turning tool cartridge may not always be usable with the present invention because of clearance and/or stability considerations. As an alternative in such situations, a reverse wedging concept may be used for driving the turning tool.

To this end as shown in FIG. 3A, the reverse wedge sealing tool indicated generally at 11 includes a turning tool block 49 received for reciprocal movement in a covered radially oriented guide slot 50. The turning tool block 49 has a turning tool 51 mounted on its radially inner end. This turning tool 51 is advanced toward and retracted from the workpiece by the reciprocal movement of block 49 controlled by a sliding tongue and groove camming connection indicated generally at 41A. This tongue and groove interconnection converts the axial reciprocation of wedge block 33E to radial reciprocation of turning block 49. The tongue and groove interconnection 41A for the turning tool block 49 is reversed in its angularity relative to the tongue and groove camming interconnection employed for the thread forming chaser blocks, i.e. the load flank, stab flank and mid flank chaser blocks, as shown by comparing the two camming interconnections of FIG. 3A. Therefore, the turning tool chaser block will be radially retracted when the stab flank, load flank and mid flank chaser blocks are radially advanced and vice-a-versa. Thus in operation, the turning tool may be used to form a sealing surface before threading by moving the drive ring 38 in the opposite axial direction than that described above to advance or extend the turning tool 51 and retract the thread forming tools. Similarly, at the completion of the thread forming operation at the thread termination, the turning tool chaser could again be advanced or extended to form a second seal or thread relief if necessary.

Although FIGS. 1 through 4 have illustrated chasers having multiple teeth for the die head of the present invention, it will be appreciated that chasers having single teeth may also be used. To illustrate this possibility, FIG. 4 has been included showing load flank and stab flank chasers having single teeth, identified by 23C and 30C, respectively. The number of teeth on the individual chasers can be varied relative to one another as required by the operational parameters presented.

Figure 1A:
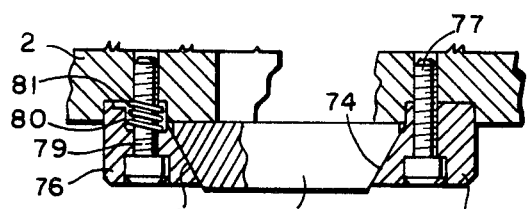
FIG. 1A is a cross section taken along the section line 1A—1A of FIG. 1 showing details of the quick change cover plate for the chaser blocks.

The above described die head can form a dual lead tapered thread in one pass. This one pass thread formation saves time in tool set-up and in actual operation. To further enhance the efficiency of this die head, ease of maintenance has been provided for quick field repairs and adjustments. To this end, the wedge blocks driving the chaser blocks are each independently adjustable as shown in FIGS. 2, 2A and 2B, and the chaser blocks are enclosed in quick change cover plates as shown in FIGS. 1 and 1A.

Figure 2B:
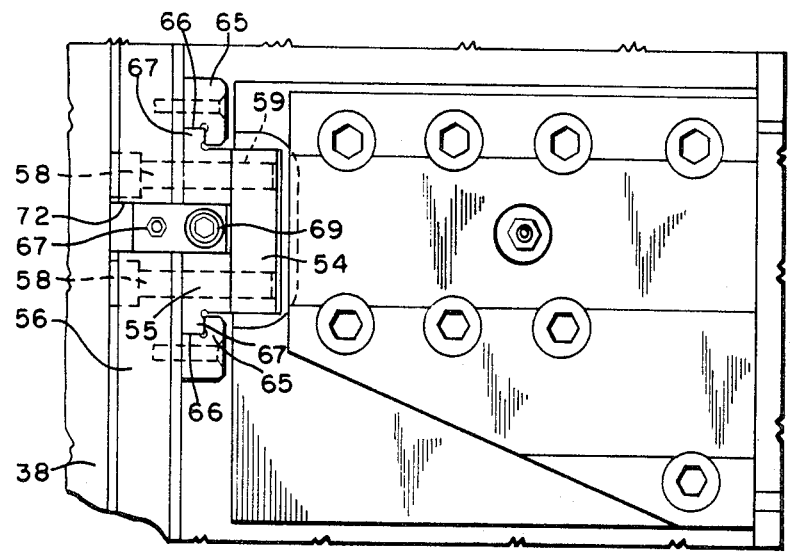
FIG. 2B is a plan view of the wedge block adjustment assembly taken from the plane 2B—2B in FIG. 2A.
Figure 2A:
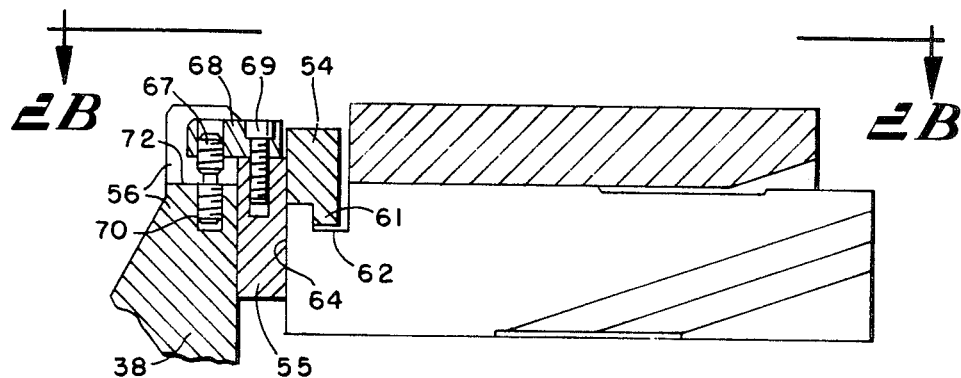
FIG. 2A is a fragmentary sectional elevation of the adjustment clamp assembly for each of the respective wedge blocks.

Turning first to FIGS. 2 through 2B, each of the wedge blocks 33A through F has a wedge block adjustment clamp assembly indicated generally at 37. Each wedge block adjustment clamp assembly includes a retaining clamp 54 and an adjustment wedge 55. The retaining clamp 54 is adjustably mounted to shoulder 56 on drive ring 38 by two spaced cap screws 58 as best shown in FIG. 2B. The threads on both screws 58 respectively mate with threads in spaced tapped holes 59 in retaining clamp 54. With such thread interconnection, rotation of the screws 58 in one direction will axially loosen retaining clamp 54 relative to wedge 55 while rotation in the opposite direction will tighten the retaining clamp 54 relative to wedge 55. The retaining clamp 54 has a downwardly projecting flange 61 received in a transverse groove 62 in the associated wedge block 33A. This groove 62 is axially wider than the flange 61 on retaining clamp 54 to permit some freedom of axial movement for the retaining clamp 54 as described in more detail below.

The adjustment wedge 55 is sandwiched between the retention clamp 54 and the shoulder 56 on drive ring 38. The adjustment wedge has an inclined camming surface 64 slidingly engaging a similarly inclined cam follower surface at the back of the associated wedge block 33A. With such camming relationship, radially inwardly directed movement of the adjustment wedge will be translated into axial movement to the right for the associated wedge block as viewed in FIG. 2A while radially outwardly directed movement for the adjustment wedge will permit the wedge block to be moved to the left as viewed in FIG. 2A. This radial movement of the adjustment wedge 55 is closely controlled for accuracy in adjustment.

In this regard, the adjustment wedge 55 has side guides 65 which are secured to shoulder 56 as best shown in FIG. 2B. These guides 65 form channels 66 slidably receiving opposed flanges 67 on the adjustment wedge 55 rectilinearly to guide the same in its radial movement. This radial movement is controlled by an adjustment screw 67 rotably mounted in a bracket 68 which is fixed to wedge 55 by fastener 69. Adjustment screw 67 has its thread mated with the internal thread in tapped hole 70 in shoulder 56, so that rotation of such screw will radially drive the bracket 68 and thus the adjustment wedge 55. The bracket 68 is received in guide channel 72 in shoulder 56, with the channel sidewalls laterally containing and thus guiding the bracket 68 in its radial movements. The radial movement of the adjustment wedge 55 is not obstructed or hindered by the cap screws 58, which have their shanks received in radially elongated holes 73 in the adjustment wedge, as best shown in FIG. 2.

In operation, if necessary to compensate for manufacturing or operational tolerances in the chasers and/or chaser blocks, the wedge blocks 33A through F may be individually or collectively adjusted by clamp assemblies 37. If adjustment of wedge block 33A to the right is required as viewed in FIGS. 2 and 2A, the screws 58 are initially rotated to move the retaining clamp 54 to the right, thereby loosening the wedge 55. The adjustment screw 67 may then be rotated to drive adjustment wedge 55 radially inwardly the desired amount. The screws 58 are then tightened to secure the wedge 55. Wedge block adjustment in the opposite direction is implemented by first loosening the screws 58, then moving the adjustment wedge radially outwardly the desired amount, and tightening the screws 58. Indicia may be associated with the heads of the screws to provide a ready indication of the wedge block location of relative adjustment.

This wedge block adjustment maintenance can be coordinated with maintenance on the chaser block and/or chaser if required. As shown in FIG. 1A, the chaser blocks each move in guide slots enclosed by quick change cover plates 24 permitting ready removal for maintenance or set up purposes. The lateral inclined edges 74 of each cover plate 24 are respectively slidably received in right wedge retainer 75 and left wedge clamp 76.

The right wedge retainer 75 is substantially coextensive with the associated guide slot in body 2 and is permanently secured to body 2 by spaced fasteners 77. The left wedge clamp 76 is of limited radial extent and is secured to body 2 by fastener 79.

The inner face of left wedge clamp 76 is provided with a socket 80 receiving one end of a spring 81 positioned between body 2 and left wedge clamp 76. The spring 81 biases the left wedge clamp 76 away from body 2. When fastener 79 is loosened, the spring 81 will urge the left clamp 76 away from body 2 to provide clearance. With such clearance, the cover plate 24 may be radially inserted over the guide slot, with its inclined marginal edges 74 being received in the inclined surfaces on the two wedge clamps. The fastener 79 is then tightened to hold the left wedge clamp 76 securely against the cover plate 24. The cover plate installation is then completed by threading fastener 83 through plate 24 into body 2. To remove cover plate 24, fastener 83 is removed and fastener 79 is then loosened to provide clearance between clamp 76 and body 2 caused by spring 81 urging clamp 76 away from body 2. The cover plate 24 is then free from lateral restraint so that such plate may be radially withdrawn to expose the guide slot in body 2 for maintenance purposes.

For limited inspection or maintenance purposes, the cover plate 24 has a cover 85 removably positioned over a cut-out portion of plate 24. The left margin of cover 85 is secured to cover plate 24 by spaced fasteners 86. The right margin of cover 85 has two projecting flanges 87 with semicircular cutouts received around and embraced by raised fastener heads 88 in right wedge retainer 75.

I claim:

1. A rotary die head comprising a rotating body having a bore with central axis that is coaxial with the axis of a workpiece being threaded thereby during relative axial movement therebetween, at least two circumferentially spaced guide slots in said body, said guide slots having radial components of orientation but different axial components of orientation relative to said body, at least first and second carrier blocks respectively received in said guide slots, means for selectively simultaneously reciprocating said carrier blocks in said guide slots, first and second tool means respectively carried by said reciprocating first and second carrier blocks for advancement toward and retraction away from said workpiece while said body is rotating, said first tool means when advanced forming one flank of a thread, said second tool means when advanced simultaneously forming the other flank of the thread and said first and second tool means when advanced commonly generating the thread root.

2. The rotary die head of claim 1 wherein said first tool means cuts the load flank of the thread and moves exclusively in a radial direction and the second tool means cuts the stab flank of the thread and moves in an inclined direction at an angle matching the ratio of radial thread root change per revolution to thread root width change per revolution.

3. The rotary die head of claim 2 wherein the first and second tool means include chasers having multiple teeth axially displaced relative to one another.

4. The rotary die head of claim 2 or 3 further comprising a third guide slot in said body circumferentially spaced from said first and second guide slots and inclined at an angle having about one half of the axial root change per revolution that the second guide slot has, a third carrier block received in said third guide slot for selective reciprocation therein simultaneously with the reciprocation of said first and second carrier blocks and third tool means carried by the radially inner end of said third carrier block for advancement toward and away from said workpiece while said body is rotating, said third tool means when advanced cutting between the thread flanks to assist in root generation.

5. The rotary die head set forth in claim 4 further comprising first and second axially movable and commonly driven wedge means in said body, said first wedge means having an inclined first cam surface cooperating with a similarly inclined first cam follower surface on said first carrier block, said second wedge means having a second inclined cam surface cooperating with a similarly inclined second cam follower surface on said second carrier block, the first and second cam surfaces being inclined at different angles corresponding to the respective different orientations of the first and second guide slots in said body to cause said first and second carrier blocks and first and second tool means carried thereby to be simultaneously advanced and retracted in equal radial magnitudes but at different leads.

6. The die head of claim 5 further comprising a third axially reciprocal wedge means commonly driven with said first and second wedge means, said third wedge means having a third cam surface cooperating with a similarly inclined third cam follower surface on said third carrier block, said third cam surface being inclined at a different angle from said first and second cam surfaces to drive said third carrier block in said third slot a radial distance equal to said first and second carrier blocks but at a different lead.

7. The die head of claim 6 further comprising a turning tool carrier block reciprocally driven in a guide slot in said body and moving in opposite radial directions from the thread forming carrier blocks.

8. The die head of claim 6 further comprising clamp assemblies for securing the individual wedge means to a common drive ring.

9. The die head of claim 8 wherein each clamp assembly has an adjustment means to adjust the axial position of the wedge means as required by manufacturing and operational tolerances.

10. The die head of claim 7 wherein said turning tool carrier block carries a turning tool on its radially inner end which, when advanced, cuts a seal or thread relief surface on the body while the thread cutting rools are radially retracted.

11. The die head of claim 10 further comprising a tool turning wedge block axially driven simultaneously with and in the same direction as the other wedge blocks, the tool turning wedge block having a cam surface thereon reversed in inclination from the cam surfaces on the other wedge blocks, said reversed cam surface mating with a similarly inclined cam follower surface on said turning tool carrier block to drive the turning tool carrier blocks in opposite radial directions from the thread forming carrier blocks.

12. The die head of claim 11 further comprising clamp assemblies for securing the individual wedge means to a common drive ring.

13. The die head of claim 12 wherein each clamp assembly has an adjustment means to adjust the axial position of the wedge means as required by manufacturing and operational tolerances.

14. The die head of claim 2 further comprising a turning tool carrier block reciprocally driven in a guide slot in said body and moving in opposite radial directions from the thread forming carrier blocks.

15. The die head of claim 14 wherein said turning tool carrier block carries a turning tool on its radially inner end which, when advanced, cuts a seal or thread relief surface on the body while the thread cutting tools are radially retracted.

16. The die head of claim 15 further comprising a tool turning wedge block axially driven simultaneously with and in the same direction as the other wedge blocks, the tool turning wedge block having a cam surface thereon reversed in inclination from the cam surfaces on the other wedge blocks, said reversed cam surface mating with a similarly inclined cam follower surface on said turning tool carrier block to drive the turning tool carrier blocks in opposite radial directions from the thread forming carrier blocks.

17. The rotary die head of claim 1 wherein said first and second tool means generate the thread crests simultaneously with the flank and root generations.

18. The die head of claim 1 wherein the guide slots are individually covered by selectively removable front plates.

19. The die head of claim 18 wherein said front plates have retainers secured to the body to embrace and hold inclined edges on the front plates, one of said retainers being a spring loaded clamp to provide clearance for cover plate movement when such clamp is loosened.

20. The rotary die head set forth in claim 1 further comprising first and second axially movable and commonly driven wedge means in said body, said first wedge means having an inclined first cam surface cooperating with a similarly inclined first cam follower surface on said first carrier block, said second wedge having a second inclined cam surface cooperating with a similarly inclined second cam follower surface on said second carrier block, the first and second cam surfaces being inclined at different angles corresponding to the respective different orientations of the first and second guide slots in said body to cause said first and second carrier blocks and first and second tool means carried thereby to be simultaneously advanced and retracted in equal radial magnitudes but at different leads.

21. The die head of claim 20 further comprising a third axially reciprocal wedge means commonly driven with said first and second wedge means, said third wedge means having a third cam surface cooperating with a similarly inclined third cam follower surface on said third carrier block, said third cam surface being inclined at a different angle from said first and second cam surfaces to drive said third carrier block in said third slot a radial distance equal to said first and second carrier blocks but at a different lead.

22. The die head of claim 21 further comprising clamp assemblies for securing the individual wedge means to a common drive ring.

23. The die head of claim 22 wherein each clamp assembly has an adjustment means to adjust the axial position of the wedge means as required by manufacturing and operational tolerances.

24. The die head of claim 21 further comprising a turning tool carrier block reciprocally driven in a guide slot in said body and moving in opposite radial directions from the thread forming carrier blocks.

25. The die head of claim 24 wherein said turning tool carrier block carries a turning tool on its radially inner end which, when advanced, cuts a seal or thread relief surface on the body while the thread cutting tools are radially retracted.

26. The die head of claim 25 further comprising a tool turning wedge block axially driven simultaneously with and in the same direction as the other wedge blocks, the tool turning wedge block having a cam surface thereon reversed in inclination from the cam surfaces on the other wedge blocks, said reversed cam surface mating with a similarly inclined cam follower surface on said turning tool carrier block to drive the turning tool carrier blocks in opposite radial directions from the thread forming carrier blocks.

27. The die head of claim 25 further comprising clamp assemblies for securing the individual wedge means to a common drive ring.

28. The die head of claim 27 wherein each clamp assembly has an adjustment means to adjust the axial position of the wedge means as required by manufacturing and operational tolerances.

29. The rotary die head of claim 1 wherein said first tool means generates the thread crest simultaneously with the flank and root generation by the first and second tool means.

30. The rotary die head of claim 1 wherein said second tool means generates the thread crest simultaneously with the flank and root generations by the first and second tool means.

* * * * *